No. 817,896. PATENTED APR. 17, 1906.
J. B. BARTHOLOMEW.
STRAW STACKER.
APPLICATION FILED MAY 26, 1900. RENEWED NOV. 11, 1905.

Witnesses
N. Curtis Lammont
Walter Williams

Inventor
John B. Bartholomew.
by
H. H. Bliss
his Attorney

No. 817,896. PATENTED APR. 17, 1906.
J. B. BARTHOLOMEW.
STRAW STACKER.
APPLICATION FILED MAY 26, 1900. RENEWED NOV. 11, 1905.

Witnesses
N. Curtis Lammont
Walter Williams

Inventor
John B. Bartholomew
by H. H. Bliss his Attorney

UNITED STATES PATENT OFFICE.

JOHN B. BARTHOLOMEW, OF PEORIA, ILLINOIS, ASSIGNOR, BY MESNE ASSIGNMENTS, TO THE SATTLEY STACKER COMPANY, OF INDIANAPOLIS, INDIANA, A CORPORATION OF MAINE.

STRAW-STACKER.

No. 817,896.  Specification of Letters Patent.  Patented April 17, 1906.

Application filed May 26, 1900. Renewed November 11, 1905. Serial No. 286,910.

*To all whom it may concern:*

Be it known that I, JOHN B. BARTHOLOMEW, a citizen of the United States, residing at Peoria, in the county of Peoria and State of Illinois, have invented certain new and useful Improvements in Straw-Stackers, of which the following is a specification, reference being had therein to the accompanying drawings.

Fig. 12 is a side view.

This invention relates to improvements in straw-stacking machines of the class of those which are secured directly to the threshing and separating machine, the straw from which is taken by the stacker and carried to points well in the rear and disposed of in stacks or otherwise. In some cases these "attached" stackers, as they are termed, have been made in two principal sections, one connected to the threshing and separating machine, and an upper or outer section hinged to the inner one, and the inner section has been formed of two parts, a bottom part upon which the straw is deposited from the separator, and an upwardly-extending part, these being rigidly fastened together. I have found that several disadvantages are incident to constructions of this sort, particularly this, that it has been impracticable to move the outer or delivery end of the upper swinging section on such lines and in such manner as to stack the straw in a desirable way. The inner section having its upward rising or inclined part rigid with the horizontal part it has been impossible to change the distance of its upper end from the axis of rotation, and consequently when the upper swinging section was moved through its arc it rapidly approached and receded from an extreme vertical line, and hence the center of the top of the stack was necessarily near the rear end of the separator.

One of the purposes of the present invention is to so construct, connect, and relate the parts of the stacker that the outer delivery end of the upper section can be carried up and down over a long distance and at the same time be held in or nearly in vertical lines uniformly distant from the axis of horizontal rotation of the stacker.

Other objects and purposes are aimed at which will be understood from the drawings and the description below.

A portion at the rear end of a threshing and separating mechanism is shown by the letters A A', the rest of this mechanism not being essential to the stacker or the understanding thereof. At the lower part of the separating-frame there are supporting sills or beams B, extending backward. Upon these are supported the rotary frame at the bottom of the stacker, (indicated as a whole by D.) Said sills or beams B are arranged in such way as to simplify and condense the mechanism, they being shown as converging to a central eye at *b* and being rigidly secured to the rear cross-beams of the separator frame, as at A³.

Figure 12:
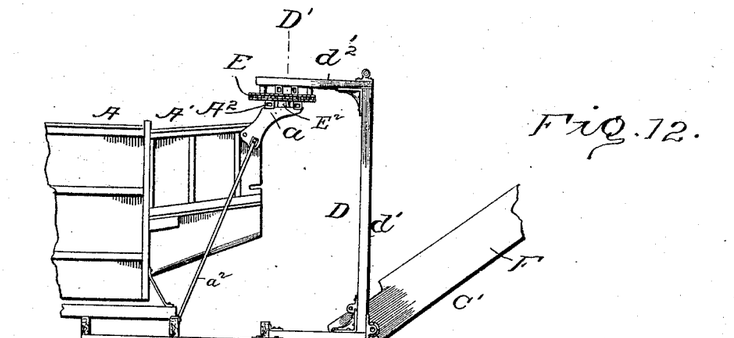
Figure 13:
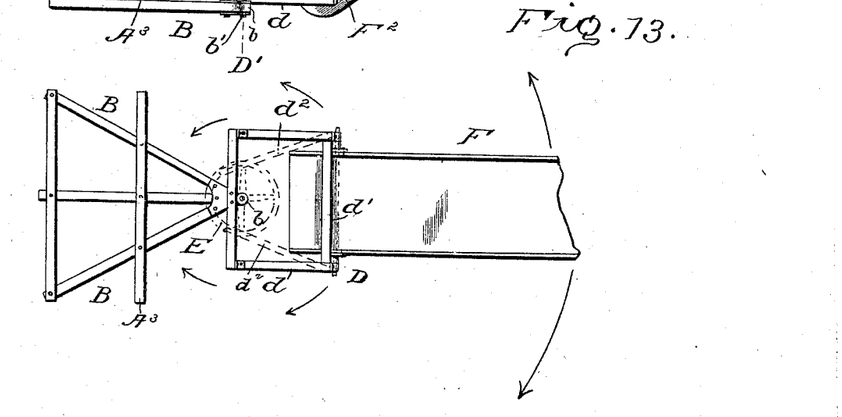
Fig. 13 is a plan view, showing the relations to the main frame of the separator of the intermediate frame carrying the stacker-frame.
Figure 14:
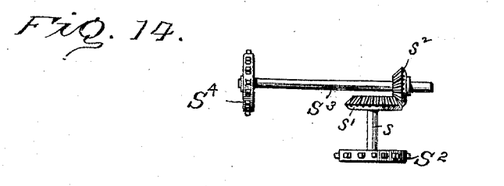
Fig. 14 is a detail view.

The frame D, which is one of the peculiar characteristics of my invention, has the horizontal bars *d d* at the bottom, the vertical uprights *d' d'* and the backwardly inwardly converging bars *d²* at the top. This frame swings freely horizontally upon the vertical axis (indicated by the line $D'$, Fig. 12.) It is held to the main frame of the separator by a two-part hinging device, one being below the operative parts of the separator and stacker at $b\ b'$, and the other being above them, as at $E\ E'$. The lower horizontal bars $d$ carry one member, as at $b'$, of the lower hinge, this being a pivot fitting in the aforesaid eye $b$, and the upper parts $d^2$ are secured to hinging elements, one being the wheel $E$ and the other being the bracket or stand $E^2$, which parts also serve other purposes, as will be described. The parts $E\ E^2$ are supported upon cross-bars $A^2$, which are held by brackets $a$, secured to the rear end of the framework $A\ A'$ of the separator.

$a^2\ a^2$ are braces which take thrust from the upper and rear parts of the frame, they extending down and outward to cross-sill beam $A^3$ at the lower part of the separator-frame.

It will thus be seen that the present mechanism provides an attached stacker—that is to say, one secured directly to the rear end of the thresher-frame and which is held and supported by hinging devices extending over a prolonged vertical line—to wit, a line extending from above the uppermost parts of the thresher-frame to points at the bottom thereof and having its belt or belts driven from the upper part of the hinging mechanism. As a result, I am enabled to much more advantageously utilize the room and spaces at the rear end of the thresher and separator than has been the case with any attached stacker wherein the driving and oscillating mechanism were placed near the ground and below the other operative parts. In such case the gearing was either brought so near the ground as to be frequently rendered useless by the entrance of foreign materials, or to obviate this trouble was lifted to such an extent as to compel the placing of the carrier devices in high places, and therefore where they could not advantageously receive the chaff and the straw from the separating devices in the machine. All of these difficulties are obviated in the present construction. Nothing is left below the operative parts of the stacker except a simple pivot, such as that at $b\ b'$, with which there can be no interference from dirt, straw, and the like, and which therefore can be placed close to the ground, permitting the carrier parts to be correspondingly lowered, so as to give ample opportunity for the reception of all the chaff and the straw. Again, the gearing is placed at an elevated point where it is protected from soil and foreign materials and where it can be readily reached for oiling, cleaning, and repairing. Upon the framework thus provided—to wit, the main frame and the supplemental frame $D$, extending from the bottom to the top of the main frame—I support the stacker mechanism proper. It contains a short horizontal carrier $M$, constituting the initial straw-receiving stacker-section and the main delivery-carriers and is indicated as a whole at $C$, comprising an upwardly-inclined part and a delivery or end portion, as at $C'\ C^2$.

The present machine is characterized by having the inner member $C'$ of the stacker-section, which is intermediate the horizontal carrier or initial straw-receiving section and the outer section $C^2$, hinged at its lower end in a way that will be described in detail, so as to overcome serious disadvantages that are experienced with machines of the sort in which this part of the mechanism is rigid with the inner parts and prevented from moving up or down. This inner section has side bars or boards $F$ and one or more cross boards or bars. At the lower end it is hinged at the axis of the shaft $F^2$—that is, the axis of the roller of the carrier-belt. A hinge $d^6 f$, of the sort shown in Fig. 9, can be employed, which will take the weight off from the shaft and hold the parts in proper position, irrespective of their adjustment and of the position of the elevator, which in this case is constantly varying in correspondence with the position of the outer delivery-section.

At the lower end the elevator has a curved bottom $f'$ to serve to hold the straw properly until it is engaged by the carriers. The upper or outer carrier is formed of the inner part $c$, having the lower bars $g$ and the hopper or fender boards $g'$, and an outer part $c'$, having the bars $g^2$, this outer part being hinged to the inner at $c^2$.

The outer or third stacker-section $C^2$ is as a whole secured to the inner or inclined section $C'$ in a peculiar way. The attempt has been made heretofore in stackers of this general class to employ a carrier or belt extending continuously from points below the straw-hopper up the inclined part and out to the free end of the delivery part and then back over the whole course; but these are subject to serious disadvantages, because of the great length and the various deflections in the path of the apron. The present mechanism is characterized by having the carrying devices as a whole broken up into several independent belts or aprons. Then to properly deliver the straw from one to the other important features have had to be introduced. It will be seen that the inner end of the outermost carrier $N'$ is under the upper end of the carrier $N$, and consequently the straw can be readily taken up by the latter, thrown over its top roller, and delivered to the out-moving part of the carrier $N'$; but it then becomes necessary to provide means for folding the outermost carrier backward toward the separator, which could not be accomplished with an ordinary mounting and connection of these several parts. I attain these ends by interposing links or radius bars $H$ between the inclined carrier and the outermost carrier. Of these links there is one upon each side of the machine, and each is hinged at the axis of the shaft O, carrying the rollers n' at the upper end of the inclined elevator N. At their lower ends these links are hinged to the frame of the outer carrier-section, preferably by connecting them thereto at the axis of the shaft p' at the inner end of the outermost carrier N'. At H' there is a stop upon each side of the machine connected to the outermost carrier-section and lying in the vertical planes of the neighboring link H, and of such stops there may be one on each side. It will now be seen that when links of this character are present the outermost carrier-section can have its inner end brought well in under the upper end of the elevator N, and it will be seen that the outer end of the outer section can be carried upward and backward freely, swinging around the axis at p'. As soon as the stop H' strikes the link H motion around the axis p' ceases and movement around the axis at O commences, both the outermost carrier-section and the links H H having this latter movement, and such movement can continue until the carrier is folded into the position shown by the innermost dotted lines in Fig. 1—that is to say, until it is in the position occupied during transportation.

Figures 1, 9, 11:
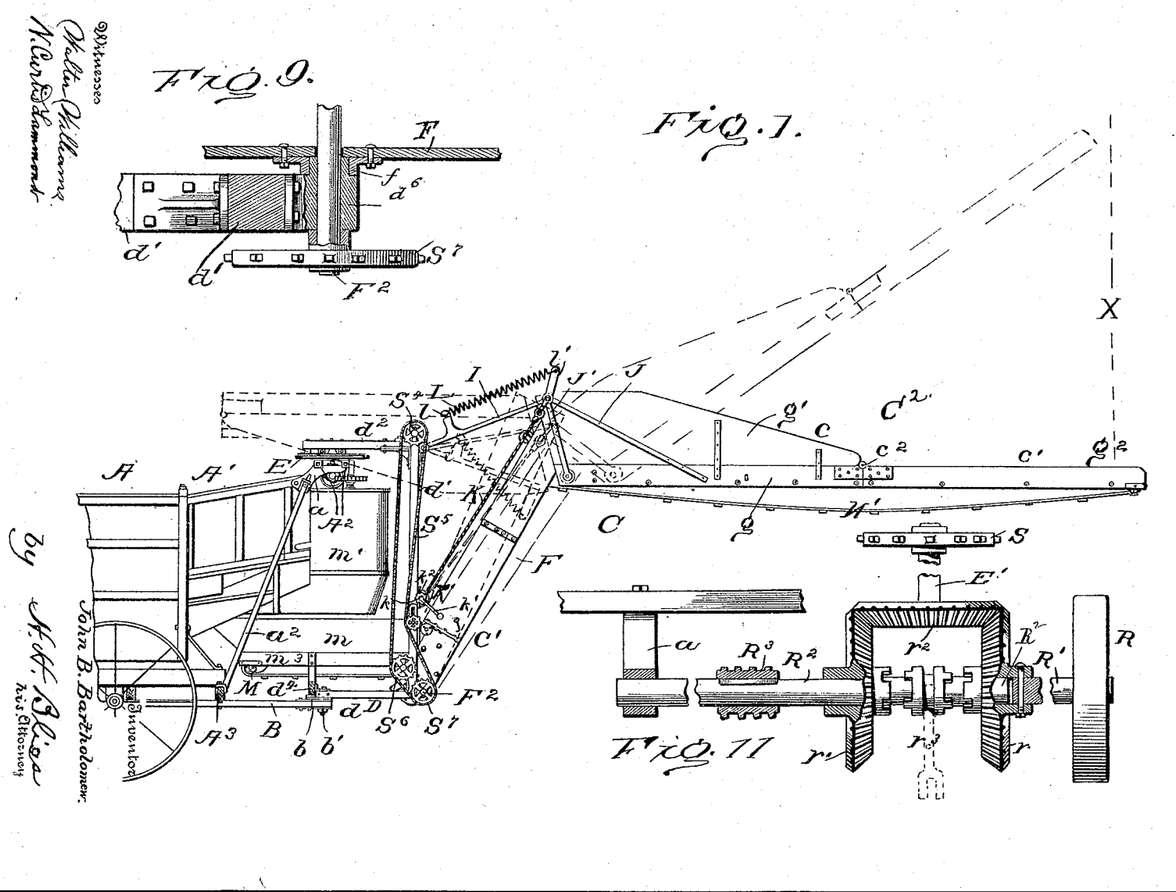
Figure 1 is a side elevation of a straw-stacking mechanism embodying my improvements.
Fig. 9 is a view showing the hinge at the bottom of the inclined elevator.
Fig. 11 is a view, partly in section, partly in elevation, of parts of the prime gearing by which continuous motion is imparted to the carriers and reciprocating movements imparted to the swinging frames.
Figures 5, 8, 10:
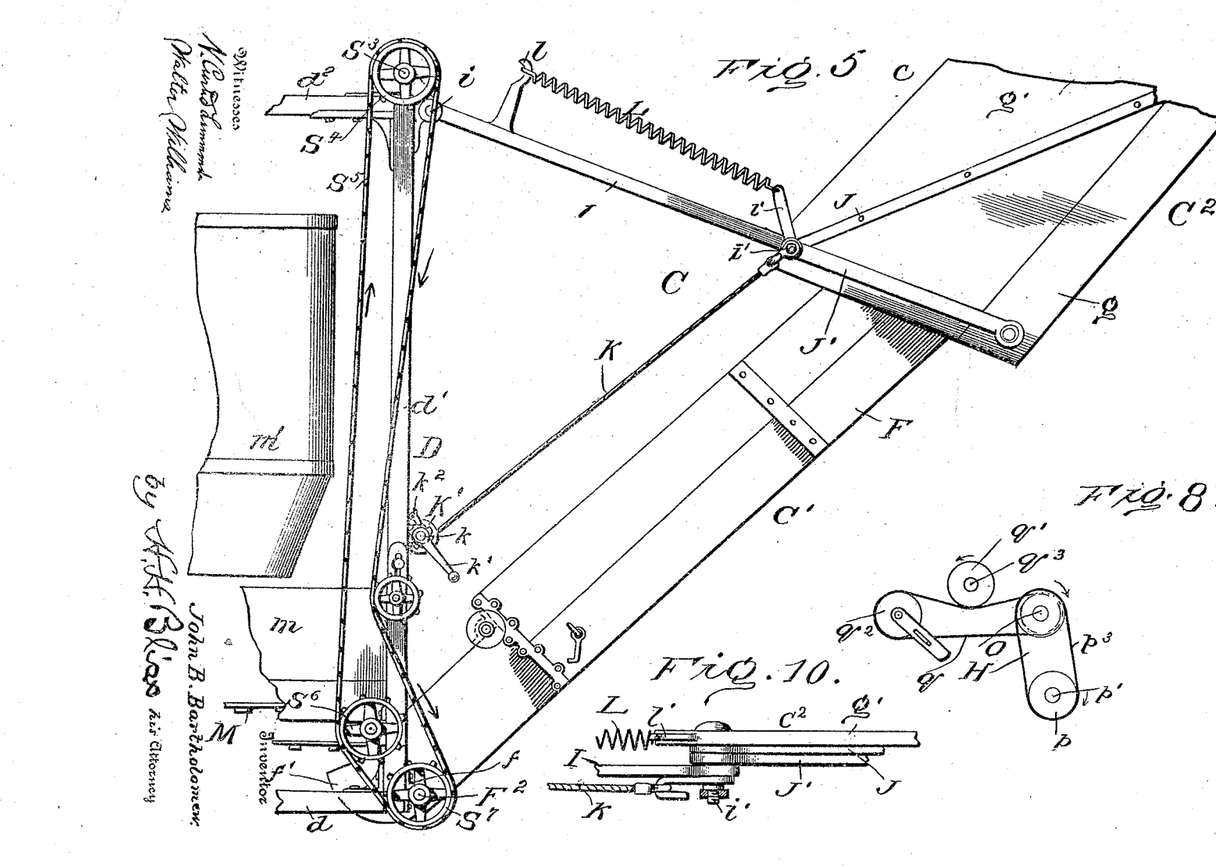
Fig. 5 is a side elevation of some of the parts shown in Fig. 1, on a larger scale.
Fig. 8 is a diagrammatic view of some of the operative parts where the stacker-sections come together.
Fig. 10 is a detail showing the devices connected to the carriers near their joint by which they are raised and lowered, folded, and opened.

By preference I so relate the stops H' and the links H that they will not mutually engage until about the time that the outermost section reaches the lines where it is practically a straight line continuation of the innermost section C', as shown in dotted lines, Fig. 1, and in full lines in Fig. 5. The movements, adjustments, and fastening in different positions of the stacker-sections C and C² are effected as follows:

I is a link which is pivoted at i to the above-described frame D and at i' to the outermost stacker-section.

J J' are brace-bars or strengthening-bars secured to the wooden parts of the stacker to receive and distribute the strain. The link I is connected to them by the said pivot i', as shown in Figs. 5 and 10.

K is a rope or cable which is loosely connected to the stacker-section C² at the pivot i' and at the other end is connected with a drum K' upon a winding-shaft k, having a hand-crank k' and a lock k². There should be a cable and drum at each side of the machine in order to distribute the lifting power and strains uniformly.

My improvements in respect to hinging the outer stacker-section, as hereinbefore described, are not limited to use with the above-described means for swinging the said section in vertical planes. For this purpose any suitable means may be employed. In my application, Serial No. 18,097, filed May 26, 1900, I have shown and described an outer stacker-section hinged by two differently-located transverse axes combined with a toothed gearing for swinging the section.

Figures 6, 7:
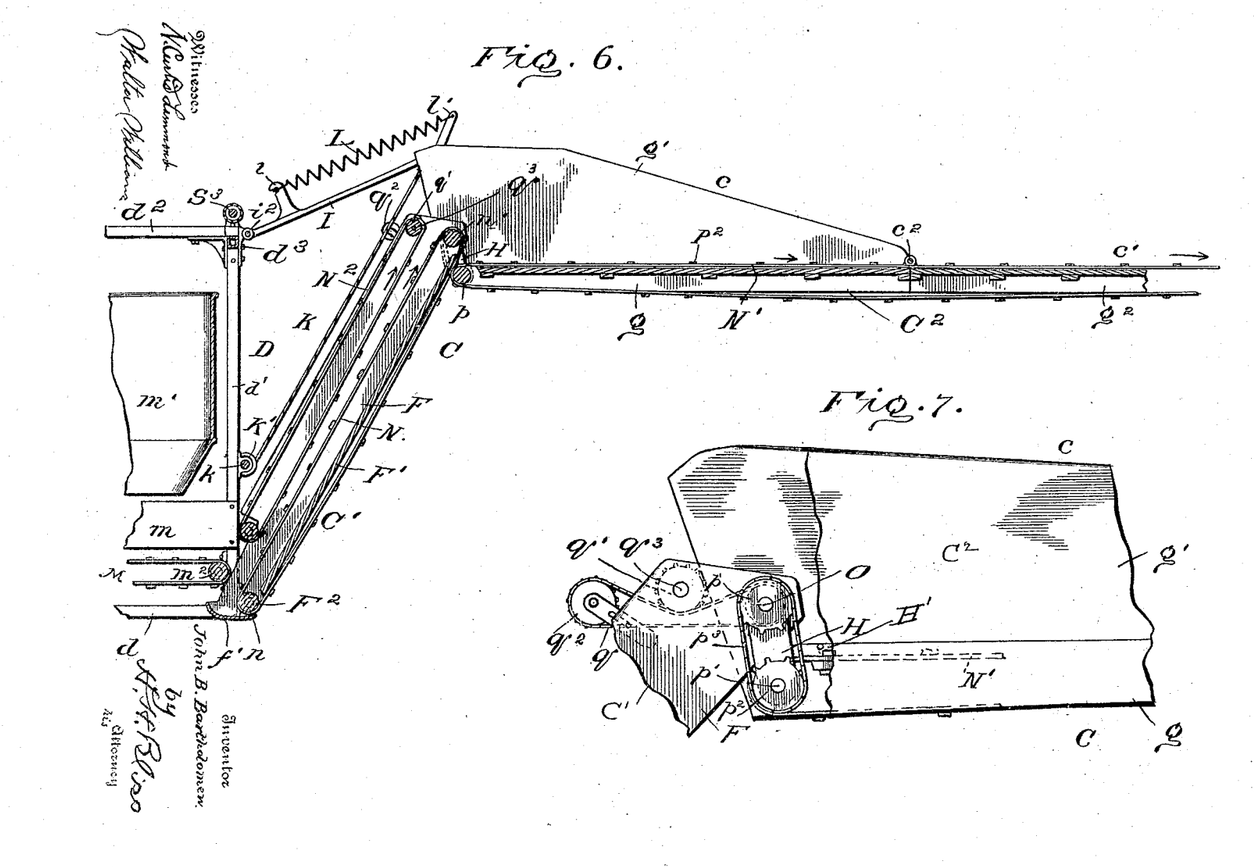
Fig. 6 is a vertical longitudinal section of the carriers and their frames.
Fig. 7 is a view in side elevation, parts being broken away, showing some of the devices at the place where the inclined elevator and the outer carrier are joined together.

To assist in the manipulations of the parts of the stacker, I employ a spring, as at L. It is connected to a lever-arm l' on the outer stacker-section and to an arm l on the link I. The several attachments for the spring are so related to each other that when the outermost stacker-section is in its horizontal outer position, as shown in Figs. 1 and 6, the spring L will be exerting the utmost of its tension and be the most helpful. As the outermost section swings toward the vertical the spring loses its force, which becomes $nil$ at the time that the gravity of the stacker is $nil$ as against the winding-rope, and then as the stacker descends upon the inner side over the separator it does so against the tension of the spring, which now increases again until its limit is attained at the time the folded position is reached. Thus the spring helps the operator and takes nearly the entire gravity-load from the winding mechanism both when bringing the stacker from its innermost position to the vertical and when bringing it from its outermost to the vertical, and, vice versa, the spring resists the descending movements upon either side of the vertical, so as to not only relieve the operator, but to avoid danger from blows or shocks.

The operation of adjusting the stacker-sections C' and C² to their several operative positions from that shown in Fig. 1 and also of folding them will be readily understood. The operator by means of the crank k' draws upon the rope K, which pulls down the hinge point i' and forces down the upper end of the inner section and simultaneously lifts up the outer end of the outer section C², the two sections moving in opposite directions. The downward movement of the inner section C' takes place about the axis of the shaft at F². The upward swinging of the outer section C² takes place around the axis p' of the inner roller p of the outer carrier; but when the upper section reaches or approaches the lines of the inner section C' the stop-lugs H' impinge upon the links H, and any further upward and backward movement of the outer section C² takes place around the axis at O. At the time the outer section reaches its vertical position—that is, when its center of gravity is directly above its hinge-axis—the innermost section C' has just commenced to return from its lowest position, and the link I at its outer end begins to travel relatively below and around the axis at O. Moreover, just as the outermost section reaches the vertical position the lower end of the link I reaches the line that passes through the winding-drum K', and the axis O and the shortening of the rope ceases. If thereafter the upper section is carried on backward and inward, the lower section C' of the stacker moves upward again, the movements of both sections being controlled again by the rope K, but it now lengthening or being released from the drum, which continue until the folding-section reaches the top of the separator, at which time the end of the link I is at a point below the axis O corresponding to the point which it occupies above it when the outer section is in the position shown in Fig. 1, and at this time the tension of the spring L is again at its utmost.

The attachments for the spring, such as at $l$ and $l'$, should be so related to the other parts that the draft-line of the spring will pass through the points $l$ $l'$ and the pivot at $i'$ when the outer section is in its vertical position.

There are numerous advantages incident to a mechanism having the parts herein shown, which will be readily understood by those acquainted with such machines. By referring to the line indicated by X in Fig. 1 it will be seen that the downward swinging of the stacker-section $C'$ when the outer section $C^2$ is moving upward insures that the outer end of the latter shall be kept relatively near to the said line X, and that consequently the straw will be properly delivered at the central part of the stack, the machine in this respect being different from those heretofore used in which the said inner stacker-section $C'$ was rigidly fastened at its lower end and in which the only swinging motion, vertically, was that incident to the outermost section around the axis at its inner end, because this latter movement being upon a relatively short radius results in the rapid departure of the outer end of the part $C^2$ from the line X as the stacker moves upward, the consequence being that it is difficult to form a uniformly-shaped stack.

By employing the intermediate frame D between the main frame and stacker I am enabled to permit both the stacker-sections to have the movements described and at the same time provide a strong base from which they can be supported and which shall carry the power-transmitting parts.

The movable parts of the mechanism above described are actuated as follows: R is the belt-wheel rotated by a belt connected with a suitable driving-shaft on the thresher and separator. This wheel is connected to a shaft $R'$ $R^2$, whose two parts are loose as to each other, the part $R'$ being connected rigidly to a bevel-wheel $r$ and the part $R^2$ extending loosely into the hub of said wheel. (See Figs. 4 and 11.) Upon the part $R^2$ of the shaft there is a loose bevel-wheel $r'$. The bevels $r$ $r'$ both engage with a bevel $r^2$, which is secured to a vertical shaft $E'$, mounted in the above-described bracket or its support $E^2$. At the upper end of this shaft $E'$ there is a sprocket-wheel S. This wheel is connected by a chain $S'$ with the sprocket-wheel $S^2$ on a vertical shaft $s$. At the upper end this shaft drives the bevel-gearing $s'$ $s^2$, which actuates the shaft $s^3$, which at its end has wheel $S^4$. This wheel is connected by a chain $S^5$ to the sprocket-wheels $S^6$ and $S^7$, the former being at the outer end of the horizontal carrier M below the straw-hopper and the latter being at the lower end of the carrier N. The carrier M is on rollers at $m^2$ $m^3$ and is below the rotary hopper $m$, which in turn is below the straw-chute $m'$. The elevator N is at the lower end supported by the rollers $n$ on the shaft $F^2$ and the upper end on the rollers $n'$ on the shaft O. Power is transmitted from the elevator N on the shaft O to the carrier $N'$ on the stacker-section by means of the sprocket-wheels $p$ and $p^2$ and the chain $p^3$, these being outside of the bars or boards F and inside of those at $g$ $g'$. The shafts at O and $p'$ being at the constant radial distance the upper carrier $N'$ will be properly actuated in whatsoever position it may be adjusted.

Figures 2, 3, 4:
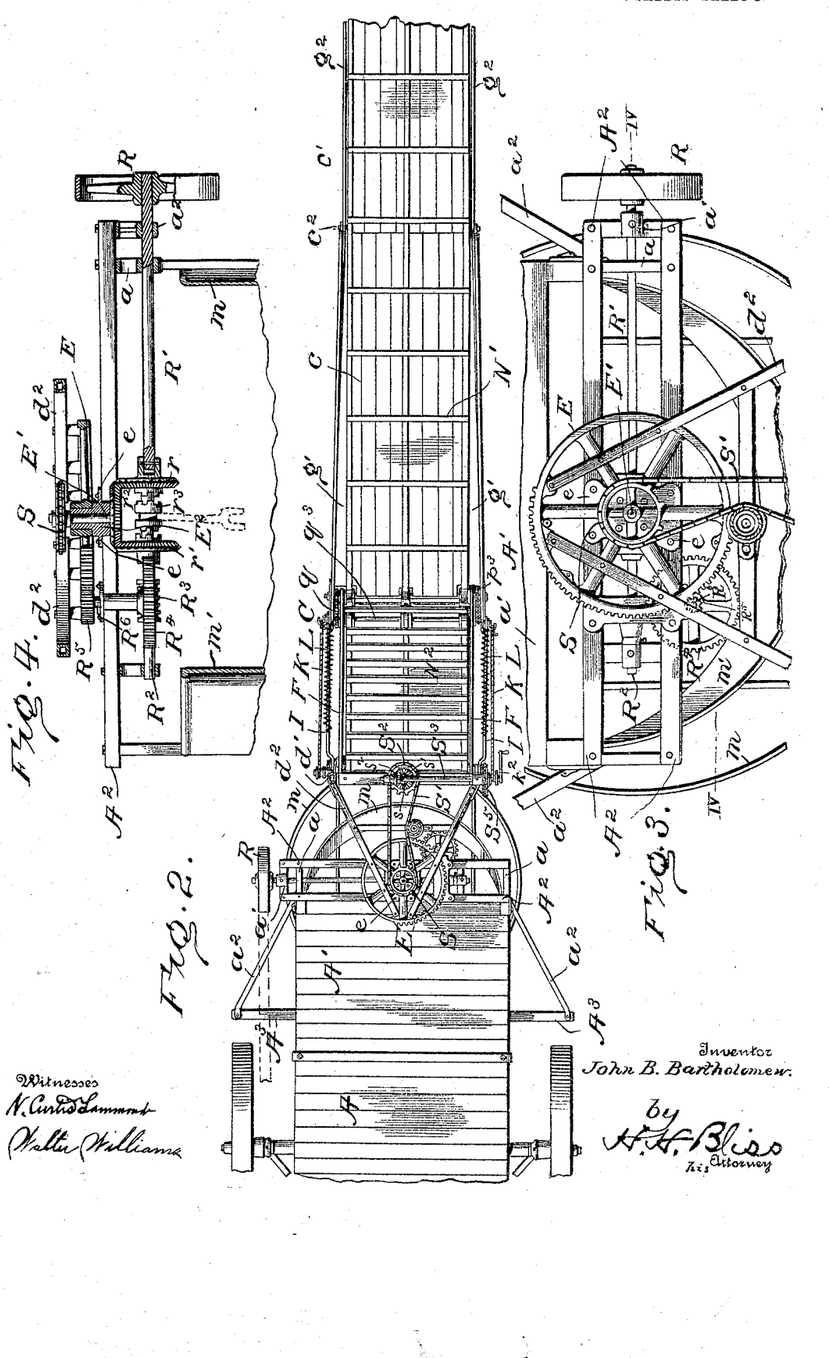
Fig. 2 is a top plan view.
Fig. 3 is a top plan view, on a larger scale, showing the prime gearing detached.
Fig. 4 is a vertical transverse section through Fig. 3 on line IV.

In order to hold the straw against the elevating-carrier N, which it will be seen is at a sharp upward inclination, I employ an under-acting belt or apron $N^2$, held by suitable rollers at its lower end and at its upper end held by rollers $q'$ on the shaft $q^3$. This shaft is driven from shaft O by the chain $q$, which passes around a tightening-idler $q^2$ and engages with the roller $q'$. The chain $p^3$ and its driving-wheels are upon one side of the stacker, and the chain $p$ and its wheels are upon the other side, as shown in Fig. 2 and Fig. 7.

From the above description of the drawings it will be seen that when the thresher and separator are in motion and the wheel R is being rotated there is a motion in one direction continuously imparted to the sprocket-wheel S and from the latter to the train of devices $S'$, $S^2$, $s'$, $s^2$, $S^3$, and $S^4$ to the chain $S^5$, by the latter to the carriers M and N, and from these to the chains $p^3$ and $q$ to the carriers $N'$ and $N^2$.

The same driving-wheel R and shaft $R'$ $R^2$ causes the horizontal reciprocating swinging of the frame D and the stacker-sections as follows: On the part $R^2$ of the shaft there is a worm $R^3$, which meshes with a worm-wheel $R^4$, the latter being on a shaft $R^6$, carrying a pinion $R^5$ at its upper end which engages with the above-described wheel E. The worm $R^3$ can be rotated first in one direction and then in the other, and thus caused to swing the frame D and the stacker C first to the right and then to the left, there being a clutch at $r^3$ for accomplishing this. This clutch is between the bevel-wheels $r$ and $r'$, and with it is combined an automatically-acting trip mechanism of any suitable sort actuated by the vibrating stacker-frame in the well-known manner or by the mechanism for this purpose described in my application, Serial No. 736,148, filed November 7, 1899. When the clutch $r^3$ is in engagement with the bevel-wheel $r$, the latter causes both the clutch and the shaft $R^2$ to turn with said bevel-wheel, the clutch being splined to the shaft; but when the clutch is in engagement with the other bevel-wheel $r'$ the shaft and the worm $R^3$ will be turned in the opposite direction, the bevel $r'$ rotating oppositely to that at $r$ and the shaft $R^2$ being loose therein. Thus it will be seen that I effect the swinging of the stacker alternately in opposite directions by the same power devices which cause the movement of the carriers continuously in one direction.

The vertical movement or swinging of the outer stacker-section $C^2$ for the purpose of folding for transportation may, however, be downward, so that the various parts $C'$ $c'$ $c^2$ of the stacker will when folded lie in substantially vertical planes at the rear end of the threshing-machine. For some reasons this construction is preferable, as by my invention comprising a peculiar mode of pivoting and folding the parts I am enabled to effect a very compact arrangement of the parts for transportation, bringing the upwardly-extending stacker-section $C'$ close against the rear side of the frame D. Also this method of folding does not involve such a wide range of movement of the parts as when they are folded over upon the top of the threshing-machine in the manner already described. The modified construction about to be described is also more simple in construction and convenient in use in several respects.

Figure 15:
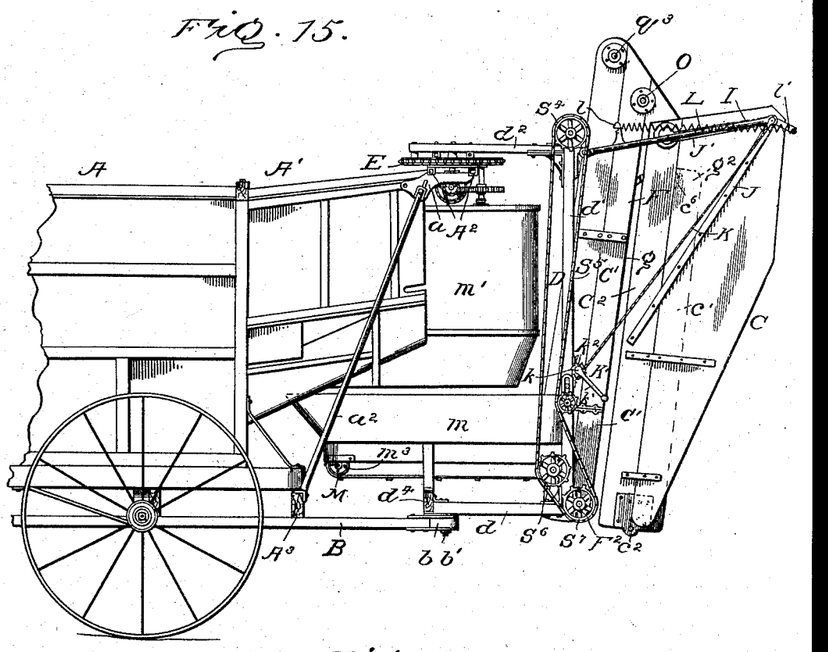
Fig. 15 is a side view of a modification of the stacker.
Figure 16:
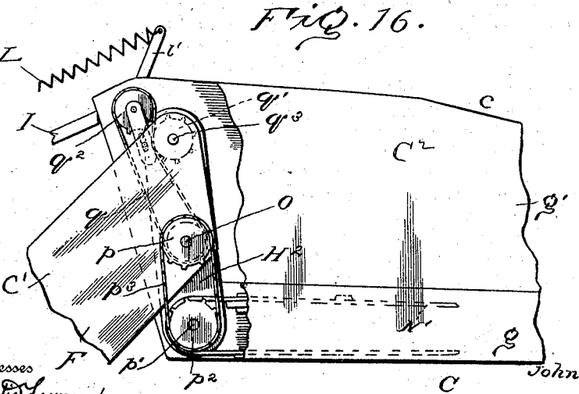
Fig. 16 is a view, partly broken away, of the adjacent ends of the stacker-frame sections in said modification.

The construction and arrangement of parts last referred to are illustrated in Figs. 15 and 16, in which the stacker-section $C^2$ is pivotally connected with the section $C'$ on the shaft or axis $p'$. It is not necessary, however, that this shaft or hinge-pivot should be supported from the section $C'$ by the movable links H, heretofore described, but the same may be carried in or on the side boards F or brackets or extensions $H^2$, attached to the same, Fig. 16. The arrangement of the parts is such that the rear end of the section $C^2$ may pass between the links I when said section is in substantially vertical position, so that said links will hold the folded stacker securely to the rear of the frame D, as seen in Fig. 15. I prefer to employ the spring L in this construction also, arranging the same to connect a suitable point or arm $l$ upon the link I with an arm $l'$ on the stacker-section $C^2$. The arrangement of this spring or springs is preferably such that it is at its greatest extension and tension just before the parts of the stacker reach their final folded position, whereupon the further folding of the parts will cause the spring to pass its neutral line, and it is allowed to contract slightly, (the point of attachment $l'$ approaching slightly toward the point $l$ in the final folded position,) whereby the tension of the spring or springs has no tendency to unfold or elevate the parts of the stacker, but rather to hold them more securely in their folded position.

The operation of folding the stacker when constructed as last above described is as follows: The ropes K are let off gradually, thereby allowing the section $C^2$ to turn downward upon the axis $p'$ until the extreme outer section $c'$ is within convenient reach from the ground. This latter section is then folded up against and within the section $c$ and secured by a suitable fastening device $c^6$. The ropes K are then further let off, such weight of the section $C^2$ as is not sustained by the spring or springs L being supported by hand until the axis $p'$ passes the line of the ropes K, whereupon the latter are wound up, bringing the parts finally to the position shown in Fig. 15. When the springs L are made of sufficient strength to more than sustain the weight of the section $C^2$ in its downwardly-inclined position, the latter may be drawn down by hand, overcoming the tension of the spring or by the windlass and ropes K into the final folded position. In this folding operation the upper portion of the section $C^2$ is held away from the frame D by the links I, so that the downward movement of the axis $p'$ is accompanied by an inward swinging of the same toward the frame D, thereby swinging the section $C'$ inward against the rear end of said frame, the sections $C'$ and $C^2$ passing inward and upward between the links I during such movement. The spring or springs is or are preferably arranged so that the folding of the stacker-section will carry the point or points of attachment $l'$ a little below the points $i'$, where the links are pivoted to the section $C^2$, whereby the springs are caused to act as a locking means to retain the folded stacker in position, as already described.

In the mode of folding last described the driving of the various carrier-belts and the horizontal oscillation of the stacker are or may be effected by the same or substantially the same mechanisms as those shown and described in Figs. 1 to 14. Since in this latter construction the stacker-section $C^2$ does not fold over above the section $C'$ the side boards F and the shaft $q^3$ may be carried and mounted somewhat higher, Fig. 16, than in the first-mentioned construction, Fig. 7.

When the section $C^2$ is formed of the two pivotally-connected sections $c$ $c'$, Fig. 6, and is folded over above the thresher, it is desirable to first fold the section $c'$ against and secure it to the section $c$; but the parts $c$ $c'$ may be continuous and rigid with each other, (when the over-folding method is followed,) the hinge $c^2$ being omitted.

It will further be understood that the construction in Figs. 15 and 16 may be the same as that in Figs. 1 to 14 and that in such construction the stacker may either be folded over upon the thresher or down against the rear end thereof, accordingly as the folding is temporary or for a longer period, the overfolding being preferred when the machine is to be put away for the season or transported for long distances.

Another advantage that is incident to the construction herein shown, wherein the inner and outer sections of the stacker are each supported upon a horizontal axis and the outer section is connected with a supporting-frame by means of links or bars similar to the parts designated I, is that the force of gravity is utilized to assist in adjusting the sections from one position to another, for it will be seen the sections in a measure counterbalance each other. When the outer section is being moved into operative position the weight of the inner section will in a measure be utilized to assist in such movement, and likewise when the parts are moved in a reverse direction from that just referred to they likewise assist each other. For illustration it will be assumed that the parts are in the position indicated in Fig. 6 and that it is desired to raise the outer section into the position indicated in Fig. 5. This will necessitate a lifting of the outer section—that is, a movement thereof against the action of gravity. By reason of the connections of the parts already described the inner section will fall or be lowered somewhat at the same time that the outer section is raised—that is, it will act under the influence of gravity. It is thus seen that one of the connected parts of the apparatus falls or acts with gravity at the same time that the other part rises or acts against gravity, and there is therefore a tendency for the one part to counterbalance the other with a corresponding lessening of the force required to effect the movements. I have referred to but one movement—that from the position of parts indicated in Fig. 6 to that indicated in Fig. 5; but it is apparent that the same counterbalancing effect is utilized in the other movements of the parts of the stacker-frame, and this is true whether the construction be an overfolding one, as illustrated in Figs. 1 to 14, or an underfolding one, as illustrated in Figs. 15 and 16.

What I claim is—

1. In a straw-stacker, the combination of the supporting-frame, the inner vertically-movable section, the outer section hinged to the inner section, and mechanism connected with said two sections acting to force the inner section outward as the outer section is raised, substantially as set forth.

2. In a straw-stacker, the combination of the supporting-frame, the inner vertically-movable section, the outer vertically-movable section adapted to be folded relative to the inner section, and means for moving the outer ends of the sections simultaneously in opposite directions through a part of their paths, and moving the said ends in the same direction through another part of their paths, substantially as set forth.

3. In a straw-stacker, the combination with a thresher having a straw-outlet of the supporting-frame, the inner section, the carrier thereon, the outer section, the power devices situated above the lower end of the said carrier for horizontally rotating the stacker, and power-transmitting devices extending downward from the power mechanism to the lower end of the carrier, the straw-carrying means extending from below said outlet, substantially as set forth.

4. In a straw-stacking mechanism, the combination, with a main supporting-frame, of a stacker-frame having an upper or outer vertically-swinging section, and an inner or lower vertically-swinging section hinged to the upper section, and an intermediate stacker-carrying frame between the stacker-frame and the main frame rotatable horizontally around a vertical axis and having all of its parts fixed in relation to its vertical pivot members or bearings and connected by a hinge at its outer portion to the inner or lower section of the stacker, substantially as set forth.

5. In a straw-stacking mechanism, the combination, with a main supporting-frame, of a stacker-frame having an upper or outer vertically-swinging section, and an inner or lower vertically-swinging section hinged to the upper section, and an intermediate frame between the stacker-frame and the main frame and connected to the main frame by a relatively low hinge and a relatively high hinge, and hinged to each of the two stacker-sections, substantially as set forth.

6. In a straw-stacking machine, the combination, with a main supporting-frame, of a stacker-frame having an upper or outer vertically-swinging section, and an inner or lower vertically-swinging section, and a horizontally-swinging intermediate frame interposed between the stacker-frame and the main frame and connected to the main frame by two separated sets of hinging devices and connected to the sections of the stacker by two independent sets of hinging devices, substantially as set forth.

7. In a straw-stacking mechanism, the combination, with a main supporting-frame, of a stacker-frame having an upper or outer vertically-swinging section and an inner or lower vertically-swinging section hinged to the upper section, an intermediate frame having vertically-arranged bars and backwardly-extending bars secured to the vertical bars at the top, and backwardly-extending bars secured to the vertical bars at the bottom, the top bars being hinged to the upper part of the main frame and the bottom bars being independently hinged, hinge devices connecting the intermediate frame to the inner lower stacker-section and a supplemental bar or frame hinged to the intermediate frame and to the upper carrier-section, substantially as set forth.

8. In a straw-stacking mechanism, the combination, with a main supporting-frame, of a stacker-frame having an upper or outer vertically-swinging section, and an inner or lower vertically-swinging section hinged to the upper section, a horizontal hinge interposed between the lower section and the main frame, a vertically-swinging bar hinged to the upper section, and a horizontal hinge interposed between said bar and the upper part of the main frame, said stacker-sections being horizontally vibratable, substantially as set forth.

9. In a straw-stacking mechanism, the combination, with a main supporting-frame, of a stacker-frame having two vertically-swinging sections hinged together and arranged to vibrate horizontally, a bar or frame hinged to the upper stacker-section, a horizontal hinge between the said bar and the main frame, and power devices for moving the said bar in vertical planes, substantially as set forth.

10. In a straw-stacking mechanism, the combination with the main supporting-frame, of the stacker-frame formed in two vertically-swinging sections hinged together, and arranged to swing horizontally around a vertical axis, a hinged bar interposed between the upper stacker-section and the main frame, and means connected to said upper stacker-section for simultaneously swinging the sections in vertical planes, said hinged bar being fixed horizontally relative to said stacker-sections, substantially as set forth.

11. In a straw-stacking mechanism, the combination with a main supporting-frame, of a stacker-frame, having two vertically-swinging sections hinged together, and means for swinging the said sections simultaneously to a common line and beyond said common line, in either direction, substantially as set forth.

12. In a straw-stacking mechanism, the combination with a main supporting-frame, of a stacker-frame, having two vertically-swinging horizontally-vibratable sections hinged together, a horizontal hinge for the lower inner section, means for swinging the said lower section downward around said hinge, and simultaneously swinging the upper section upward around the hinge that joins the two sections, to bring the said sections first to a common line and then to points beyond said line, substantially as set forth.

13. In a straw-stacking mechanism, the combination with a main supporting-frame, of a stacker-frame having two sections hinged together to swing freely to a common line and to points below said line and to points above said line, both of said sections being arranged to swing vertically, substantially as set forth.

14. In a straw-stacking mechanism, the combination with a main supporting-frame, of a stacker-frame having two sections hinged together to swing freely to a common line and to points below said line and to points above said line, a sustaining device connected to the upper section and interposed between it and the main frame, and adapted to swing from a line above the hinge which unites the two stacker-sections to a line below said hinge, substantially as set forth.

15. In a straw-stacking mechanism, the combination with a main supporting-frame, of a stacker-frame having two horizontally-vibrating sections, horizontally hinged together to swing freely to a common line and to points below said line and to points above said line, said sections having independent carrier-belts with their adjacent ends arranged to swing relatively to each other, substantially as set forth.

16. In a straw-stacking mechanism, the combination with a main supporting-frame, of a stacker-frame having two horizontally-vibrating sections hinged together to permit them to be brought to a common line and to points below said line and to points above said line, and two independent carriers, one on each section, arranged to have the inner end of the outer belt lie under the upper end of the inner belt when the sections are in operative position, and to lie above the same when they are in folded position, substantially as set forth.

17. In a straw-stacking mechanism, the combination with a main supporting-frame, of a stacker-frame having two horizontally-vibrating sections, the outer upper section being connected to the inner lower section by hinging devices having two horizontal axes arranged to have said upper section swing first around one of said axes and then around the other, substantially as set forth.

18. In a straw-stacking mechanism, the combination with a main supporting-frame, of a stacker-frame having two horizontally-vibrating sections, an inclined inner or lower section, and an upper or outer section, said sections being joined together by a hinging device which is bodily movable relatively to one of said sections, whereby the axis of rock is varied, substantially as set forth.

19. In a straw-stacking mechanism, the combination with a main supporting-frame, of a stacker-frame having an inclined inner or lower section, and an upper or outer section, and a link interposed between the said sections and hinged to them independently, substantially as set forth.

20. In a straw-stacking mechanism, the combination with a main supporting-frame, of a stacker-frame having an inclined inner or lower section and an upper or outer section, a link hinged to each of said sections, and means for limiting the movements of said link relative to one of the sections, substantially as set forth.

21. In a straw-stacking mechanism, the combination with a main supporting-frame, a stacker-frame having an inclined inner or lower section and an upper or outer section, a link hinged to said sections, and a stop on the upper outer section adapted to impinge upon the said link and cause it to move relatively to the inner section, substantially as set forth.

22. In a straw-stacking mechanism, the combination with a main supporting-frame, of a stacker-frame having an inner lower section and an upper or outer section, an elevator-belt on the lower section, an independent carrier-belt on the upper section, and means for hinging the stacker-sections together, substantially as set forth, to permit the upper carrier-belt to swing vertically on one axis to bring its inner end below the upper end of the inner belt, and then upon a second axis to move the inner end of the upper belt bodily relatively to the upper end of the inner belt.

23. In a straw-stacking mechanism, the combination with a main supporting-frame, of a stacker-frame having an outer vertically-swinging section and an inner lower section, the bar I connecting the outer section and supporting-frame, a carrier-belt for the upper outer section and a separate independent belt for the inner section having its upper end above the inner end of the upper belt, and a horizontal hinge supporting the inner section whereby said inner section can be lowered to maintain the outer end of the upper section in or near a constant vertical line while the adjacent ends of the belt maintain the described relation, substantially as set forth.

24. In a straw-stacking mechanism, the combination with a main supporting-frame, of a stacker-frame having two horizontally-vibrating, vertically-swinging, stacker-sections, hinged together, a hinge for the lower end of the inner stacker-section, a vertically-swinging bar or frame hinged to the upper stacker-section and supported by a hinge at its inner end, and a horizontally-vibrating frame hinged to the main frame, and carrying the hinge of the said bar and the hinge at the lower end of the inner stacker-section, substantially as set forth.

25. In a straw-stacking mechanism, the combination with a main frame, of the stacker-frame having an outer or upper vertically-swinging section, an inner or lower section, hinged to the outer or upper section, a relatively high vertical pivot on the main frame, a second relatively low pivot on the main frame, and a supplemental frame connected to the main frame at the said pivots, and carrying at its outer portion said stacker-sections, said supplemental frame being rigid throughout its parts from top to bottom, substantially as set forth.

26. In a straw-stacking mechanism, the combination of the main frame, the upper or outer vertically-swinging stacker-section, a frame interposed between said stacker-section and the main frame, a relatively high vertical pivot for said interposed frame, a relatively low vertical pivot for said interposed frame, the parts of said frame between the pivots being rigidly secured together, a gearing mechanism mounted at the top of the main frame, means connecting the gearing with the interposed frame for oscillating it, a belt on the said upper carrier-section, an inclined belt for elevating the straw to the upper section, said inclined belt being supported by the interposed horizontally-swinging frame, and power-transmitting devices from said elevated gearing for actuating the belts, substantially as set forth.

27. In a straw-stacking mechanism, the combination with a supporting-frame, of an inner stacker-section pivotally connected with said frame and movable inward and outward at its upper end, an outer stacker-section pivotally connected with said inner section and movable in vertical planes, means for connecting said sections with said frame, said outer section being adapted to fold relative to said inner section, and stacker-actuating mechanism at the top of said supporting-frame.

28. In a straw-stacking mechanism, the combination with a supporting-frame, of an inner stacker-section pivotally connected with said frame, and movable inward and outward at its upper end, an outer stacker-section pivotally connected with said inner section and movable in vertical planes, means for connecting said frame with the inner section through the medium of said outer section, and stacker-actuating mechanism at the top of said supporting-frame.

29. In a straw-stacking mechanism, the combination with a thresher having a supporting-frame, of an inner stacker-section pivotally connected with said frame and movable inward and outward at its upper end, an outer stacker-section pivotally connected with said inner section and movable in vertical planes, connecting means between said frame and said outer section and attached to the latter at a point or points which is or are above the pivotal connection of said sections when the outer section is in its horizontal position, and stacker-actuating mechanism at the top of said supporting-frame, said thresher having a straw-outlet between said stacker-actuating mechanism and the lower portion of the stacker.

30. In a straw-stacking mechanism, the combination with a supporting-frame, of an inner stacker-section pivotally connected with said frame and movable inward and outward at its upper end, an outer section pivotally connected with said inner section and movable in vertical planes, connecting means between said stacker-sections and said frame tending constantly to draw said parts together, and stacker-actuating mechanism at the top of said supporting-frame.

31. In a straw-stacking mechanism, the combination with a supporting-frame, of an inner stacker-section pivotally connected with said frame and movable inward and outward at its upper end, an outer stacker-section pivotally connected with said inner section and movable in vertical planes, a tension device connecting said frame with said inner section through the medium of said outer section and tending to balance said sections, and stacker-actuating mechanism at the top of said supporting-frame.

32. In a straw-stacking mechanism, the combination with a supporting-frame, of an inner stacker-section pivotally connected with said frame, and movable inward and outward at its upper end, an outer stacker-section pivotally connected with said inner section and similarly movable, links connecting the said outer section with said frame, a tension device between said frame and said sections tending to draw the same together, and stacker-actuating mechanism at the top of said supporting-frame.

33. In a straw-stacking mechanism, the combination with a supporting-frame, of an inner stacker-section pivotally connected with said frame and movable inward and outward at its upper end, an outer stacker-section pivotally connected with said inner section and movable in vertical planes, and means for connecting said sections with said frame, said outer section being adapted to fold relative to said inner section.

34. In a straw-stacking mechanism, the combination with a supporting-frame, of an inner stacker-section pivotally connected with said frame, and movable inward and outward at its upper end, an outer stacker-section pivotally connected with said inner section and movable in vertical planes, and a bar or frame piece for connecting said frame with the inner section through the medium of said outer section.

35. In a straw-stacking mechanism, the combination, with a supporting-frame, of an inner stacker-section pivotally connected with said frame and movable up and down, an outer stacker-section pivotally connected with said inner section and similarly movable, a link or links connecting the said outer section with said frame at points other than those of its said pivotal connection, and means for moving said sections in vertical planes.

36. In a straw-stacking mechanism, the combination with a supporting-frame, of an inner stacker-section pivotally connected with said frame and movable inward and outward at its upper end, an outer stacker-section pivotally connected with said inner section and movable in vertical planes, and a connecting-bar between said frame and said outer section and attached to the latter at a point or points which is or are above the pivotal connection of said sections when the outer section is in its horizontal position.

37. In a straw-stacking mechanism, the combination, with a supporting-frame, of an inner stacker-section pivotally connected with said frame and movable inward and outward at its upper end, an outer stacker-section pivotally connected with said inner section and movable, in vertical planes, links connecting the said outer section with said frame at points other than those of the said pivotal connection of the outer section, and vertical pivots carrying said supporting-frame.

38. In a straw-stacking mechanism, the combination, of a rigid supporting-frame having at its upper and lower ends vertical pivoting or hinging devices, whereby said frame may be pivotally attached at widely-separated points to the upper and lower parts of a separator-frame, an inner stacker-section hinged to said supporting-frame, an outer stacker-section hinged to said inner section, links connecting said supporting-frame with the outer section independently of the hinge of the latter, and tension means connecting the stacker with the supporting-frame.

39. In a straw-stacking mechanism, the combination with a supporting-frame, of an inner stacker-section pivotally connected with said frame and movable inward and outward at its upper end, an outer section pivotally connected with said inner section and movable in vertical planes, and connecting means between said stacker-sections and said frame tending constantly to draw said parts together.

40. In a straw-stacking mechanism, the combination, with a supporting-frame, of an inner stacker-section pivotally connected with said frame and movable inward and outward at its upper end, an outer stacker-section pivotally connected with said inner section and movable in vertical planes, and a tension device connecting said frame with said inner section through the medium of said outer section and tending to balance said sections.

41. In a straw-stacking mechanism, the combination, with a supporting-frame, of an inner stacker-section pivotally connected with said frame, and movable inward and outward at its upper end, an outer stacker-section pivotally connected with said inner section and similarly movable, links connecting the said outer section with said frame, and a tension device between said frame and said sections tending to draw the same together.

42. In a straw-stacking mechanism, the combination, with a supporting-frame, of an inner stacker-section pivotally connected with said frame and movable inward and outward at its upper end, an outer stacker-section pivotally connected with said inner section and movable in vertical planes, and a tension device connecting said frame and outer section.

43. In a straw-stacking mechanism, the combination, with a supporting-frame, of an inner stacker-section pivotally connected with said frame and movable inward and outward at its upper end, an outer stacker-section pivotally connected with said inner section and movable in vertical planes, and an automatic tension device connecting said frame and outer section, the tension of said device being decreased when said outer section is elevated and substantially vertical and being increased when said section is lowered from such vertical position.

44. In a straw-stacking mechanism, the combination, with a main thresher-frame, of an inner stacker-section, a horizontal hinge through the medium of which said section is supported from said main frame, an outer stacker-section horizontally hinged to said inner section, a hinge or link connection between the outer section and main frame independent of said lower section, and a draft device K connected with said outer section.

45. In a straw-stacking mechanism, the combination, with a main thresher-frame, of an inner stacker-section, a horizontal hinge through the medium of which said section is supported from said main frame, an outer stacker-section horizontally hinged to said inner section, a hinge or link connection between the outer section and main frame independent of said lower section, a tension device L acting on said outer section, and a draft device K connected with said outer section.

46. In a straw-stacking mechanism, the combination, with a main thresher-frame, of a horizontally-vibratable frame having inwardly-extending bottom bars $d$ pivoted to said main frame, upwardly-extending bars $d'$ and inwardly-extending top bars $d^2$ pivoted to said main frame, an inner stacker-section C' hinged to said vibratable frame, an outer stacker-section $C^2$ hinged to said inner section, connecting means I between the outer section and vibratable frame, straw-carrying devices on the stacker-sections, and mechanism for actuating the vibratable frame and said carrying devices.

47. In a straw-stacking mechanism, the combination, with a main thresher-frame, of a horizontally-vibratable frame having inwardly-extending top and bottom bars vertically pivoted to said main frame, and connecting frame or bars $d'$, an inner stacker-section C' hinged to said vibratable frame, an outer stacker-section $C^2$ hinged to said inner section, connecting means I between the outer section and vibratable frame, straw-carrying devices on the stacker-sections, and mechanism at the top of the thresher-frame for actuating the vibratable frame and said carrying devices.

48. In a straw-stacking mechanism, the combination, with a main thresher-frame, of a horizontally-vibratable frame, having inwardly-extending top and bottom members vertically pivoted to said main frame, and an upwardly-extending frame member, an inner stacker-section C' hinged to said vibratable frame, an outer stacker-section $C^2$ hinged to said inner section, connecting means I between the outer section and vibratable frame, a tension device L acting between said outer section and vibratable frame, straw-carrying devices on the stacker-sections, and mechanism for actuating the vibratable frame and said carrying devices.

49. In a straw-stacking mechanism, the combination, with a main thresher-frame, of a horizontally-vibratable frame having inwardly-extending top and bottom members vertically pivoted to said main frame, and an upwardly-extending connecting-frame member, an inner stacker-section C' hinged to said vibratable frame, an outer stacker-section $C^2$ hinged to said inner section by a link mechanism H, a stop device H' on the outer section for engaging said link mechanism, means for moving the stacker-sections in vertical planes, connecting means between the outer section and vibratable frame, straw-carrying devices on the stacker-sections and mechanism for actuating the vibratable frame and said carrying devices.

50. In a straw-stacking mechanism, the combination, with a main thresher-frame, of a horizontally-vibratable frame having inwardly-extending top and bottom members vertically pivoted to said main frame, and an upwardly-extending connecting-frame member, an inner stacker-section C' hinged to said vibratable frame, an outer stacker-section $C^2$ hinged to said inner section, connecting means between the outer section and vibratable frame, straw-carrying devices on the stacker-sections, a draft device K connected with said outer section, and mechanism for actuating the vibratable frame and said carrying devices.

51. In a straw-stacker, the combination of the supporting-frame, the inner section, the carrier thereon, the outer section, the power devices situated at the top of the supporting-frame for horizontally rotating the stacker, and mechanism operatively connecting said power devices with the lower end of the carrier, substantially as set forth.

52. In a straw-stacker, the combination with the inner part of the elevator having the lower part and the upwardly-rising part connected to oscillate horizontally together, and the swinging section pivoted to the inner section on two axes eccentric to each other, of the adjusting and lifting mechanism for the swinging section, and the means for actuating the same, substantially as described.

53. In a straw-stacker, the combination, with a suitable support, of a swinging elevator or elevator-section hinged on said support, on two axial lines one above the other, and means for causing said elevator to swing upward first on the lower axis and then on the upper axis.

54. In a straw-stacker, the combination of an inner upwardly-extending elevator-section having an elevator or carrier, an outer stacker-section hinged on the first section on two axial lines one above the other and having a carrier, and means for causing the outer section to swing upward on the lower axis with the inner end of the outer carrier below the upper end of the inner carrier, and to swing backward on the upper axis to raise the outer carrier clear of the inner carrier.

55. In a straw-stacker, the combination of an inner upwardly-extending elevator-section having an elevator or carrier, an outer stacker-section hinged on the first section on two axial lines one above the other and having a carrier, links H connecting said sections, and means whereby the outer section after swinging upward engages said links to turn with the links on their upper hinge-points.

56. In an attached stacker, the combination, with a thresher, of an initial straw-receiving stacker-section pivoted to swing beneath the discharge end of the thresher, an intermediate stacker-section pivoted to the initial section on an axis at an angle to the axis of the first section, a third stacker-section pivoted to the outer end of the intermediate section and capable of swinging below the line thereof, and means for individually swinging the several sections on their respective pivots.

57. In a straw-stacking mechanism, the combination with a main supporting-frame, of a stacker-frame having two sections hinged together to swing freely to a common line and to positions below said line and to a vertical position above said line, the inner of said sections being supported by a horizontal pivot, sustaining devices interposed between the stacker-frame and the supporting-frame, the connection with the stacker-frame being close to the line where the two sections are hinged together, and means for vertically adjusting the outer section of the stacker relative to the inner section to the several positions stated.

58. In a straw-stacking mechanism, the combination with a supporting-frame, of an inner stacker-section pivotally connected with the said frame and movable inward and outward at its upper end, an outer stacker-section pivotally connected with the said inner section and arranged to be freely moved to a position in line with the inner section and to positions above said line and to positions below said line, and means for adjusting the stacker as a whole arranged to connect the said frame with one of the stacker-sections through the medium of the other section.

59. In a straw-stacking mechanism, the combination with a supporting-frame, of an inner stacker-section pivotally connected with the said frame and movable inward and outward at its upper end, an outer stacker-section pivotally connected with the said inner section and arranged to be freely moved to a position in line with the inner section and to positions above said line and to positions below said line, means for adjusting the stacker as a whole arranged to connect the said frame with one of the stacker-sections through the medium of the other section, and means for adjusting the outer section relative to the inner section.

60. In a straw-stacking mechanism, the combination with a supporting-frame, of an inner stacker-section pivotally connected with said frame and movable up and down, an outer stacker-section pivotally connected with the inner section and arranged to be freely moved to a position in line with the inner section and to positions above said line and to positions below said line, means for adjusting the stacker as a whole arranged to connect the stacker with the supporting-frame at points other than those of its pivotal connection therewith, and means for adjusting and for folding the outer section relative to the inner stacker-section.

61. In a straw-stacking mechanism, the combination with a thresher-frame, of a horizontal vibratable frame having widely-separated top and bottom vertical pivots between which the thresher discharges, an inner stacker-section connected to the outer portion of the vibratable frame by a horizontal hinge, an outer stacker-section connected to the inner section by a horizontal hinge, connecting means arranged between the stacker and the said vibratable frame for supporting the stacker as a whole in an inclined rearward-extending position, a draft device for adjusting the outer section relative to the inner one, straw-carrying devices in the stacker-sections, and means for actuating the vibratable frame and the said straw-carrying devices.

62. In a straw-stacker, the combination of a supporting-frame arranged to swing horizontally about a vertical axis, an inner stacker-section pivotally connected to the said supporting-frame by a horizontal axis, an outer stacker-section pivotally connected with the outer end of the inner section by a horizontal axis, means extending between the said supporting-frame and the stacker-sections arranged to support the stacker as a whole in different inclined positions relative to the supporting-frame, and means for adjusting the outer stacker-section relative to the inner section.

63. In a straw-stacker, the combination with a suitable support, of a folding frame comprising an inner section pivoted to the support, and an outer section pivoted to the outer end of the inner section, rigid bars or links constituting pivotal connections between the outer section and the support, the connections between the bars or links and the outer section being at a distance from the pivotal connection of such section with the inner section, whereby the weight of the inner section assists in moving the outer section, and means for moving the outer section on its pivot relative to the inner section, substantially as set forth.

64. In a straw-stacker, the combination with a support, of an inner stacker-section pivotally connected with the support, a second, outer stacker-section pivotally connected with the first-named section, braces or strengthening-pieces secured to the outer stacker-section near its inner end and extending upward above the pivotal connection thereof with the inner section, swinging rods or links arranged to engage with the upward-extending portions of the said brace or strengthening-pieces and connected also with the said support, and means for moving the outer section on its pivot relative to the inner section, substantially as set forth.

In testimony whereof I affix my signature in presence of two witnesses.

JOHN B. BARTHOLOMEW.

Witnesses:
N. CURTIS LAMMOND,
RICHARD B. CAVANAGH.